J. V. GREIF.
Plow.
No. 65,212. Patented May 28. 1867.
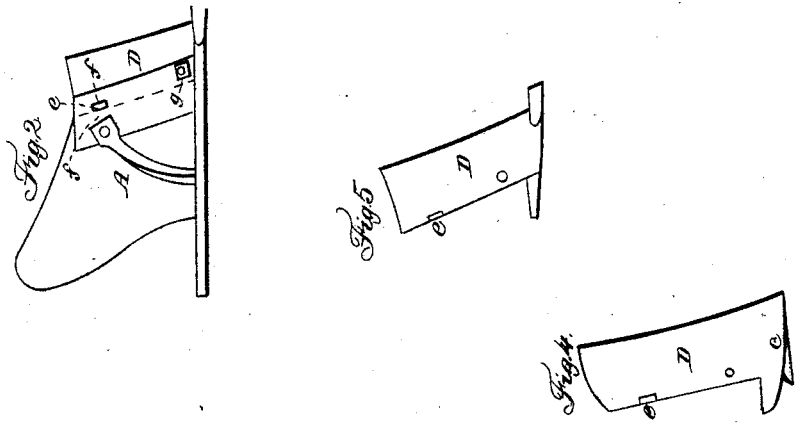
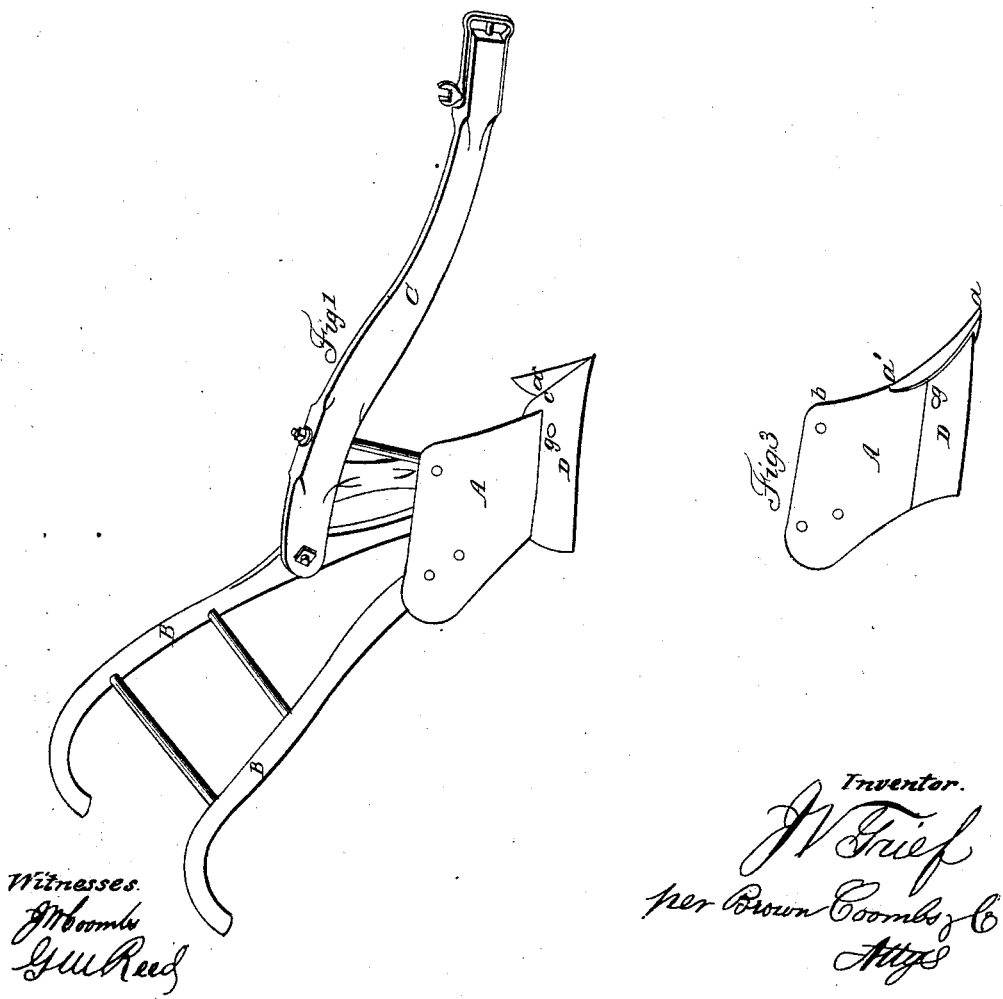
Witnesses.
J W Coombs
G W Reed
Inventor.
J V Greif
per Brown Coombs & Co
Attys

United States Patent Office.

J. V. GREIF, OF PADUCAH, KENTUCKY.

Letters Patent No. 65,212, dated May 28, 1867.

PLOUGH AND COTTON-SCRAPER.

The Schedule referred to in these Letters Patent and making part of the same.

TO ALL WHOM IT MAY CONCERN:

Be it known that I, J. V. GREIF, of Paducah, in the county of McCracken, and State of Kentucky, have invented a new and useful Improvement in Ploughs and Cotton-Scrapers; and we do hereby declare that the following is a full, clear, and exact description of the same, reference being had to the accompanying drawings, making a part of this specification, in which—

Figure 1 is a perspective view of a plough fitted for use as a cotton-scraper, and constructed according to our invention.

Figure 2 is an inverted plan view of the same implement fitted for use as a plough.

Figures 3, 4, and 5 are detached views of different parts of the same.

Similar letters of reference indicate corresponding parts in all the figures.

This invention consists in a spur or projection formed upon the share of a plough or cotton-scraper, and fitting into a hole or slot in the mould-board of the same, in combination with a removable bolt, whereby the share may be attached or detached from the mould-board much more readily and conveniently than is found practicable with the fastening ordinarily in use for that purpose, so that the plough may be easily fitted with shares of different kinds, according as it is desired to employ the same for different uses, and whereby the fastening may be made at a considerably reduced expense as compared with such ordinary fastenings.

To enable others to understand the nature and construction of our invention, we will proceed to describe it with reference to the drawings.

The mould-board shown at A may be of any appropriate form, and is secured by any suitable means to the handles B and C. The share is marked D in the drawings, and when the implement is to be used simply as a plough, has its forward edge $a'\,a$ so formed as to be in line or continuous with the corresponding edge $a'\,b$ of the upper part of the mould-board A, as shown in figs. 2 and 3, but when the implement is to be employed as a cotton-scraper this share should be constructed with a lateral extension, $c$, having formed at its outer edge an upright cutting wing or coulter, $a^*$, as shown in figs. 1 and 4; the two varieties of shares being interchangeable, so that either may be attached to the mould-board when required. In order to provide for such attachment the share is formed or furnished at its inner or rear edge with a downwardly extending projection or spur, $e$, which, (when the said inner edge of the share is placed in a suitable receiving rebate formed at the lower forward edge of the mould-board,) is fitted into a hole or slot shown at $f$ in fig. 2, and formed in the forward edge just mentioned of the mould-board. A bolt, $g$, is then passed through suitable holes formed in the share and the mould-board, and is tightened by means of a suitable nut placed underneath the mould-board, so that the end of the share C toward the beam $c$ being tightly secured to the mould-board, the spur or projection $e$ is prevented from leaving the hole or slot $f$ in which it is placed, and is thus caused to firmly confine the outer end of the share to the said board. It follows that the share is rigidly secured thereto, at the same time that it may be readily detached therefrom when desired, by simply removing the nut from the bolt $g$.

What I claim as my invention, and desire to secure by Letters Patent, is—

The spur or projection $e$, formed upon the share C, and fitting into the slot or hole $f$ of the mould-board, in combination with the bolt $g$, substantially as and for the purpose specified.

J. V. GREIF.

Witnesses:
C. KIDD,
JOSEPH ULLMAN.